(12) United States Patent
Finkl et al.

(10) Patent No.: US 7,077,993 B2
(45) Date of Patent: Jul. 18, 2006

(54) APPARATUS FOR SOFTENING A SELECTED PORTION OF A STEEL OBJECT BY HEATING

(75) Inventors: Charles W. Finkl, Chicago, IL (US); Algirdas A. Underys, Arlington Hts, IL (US)

(73) Assignee: A. Finkl & Sons Co., Chicago, IL (US)

( * ) Notice: Subject to any disclaimer, the term of this patent is extended or adjusted under 35 U.S.C. 154(b) by 0 days.

(21) Appl. No.: 10/767,037

(22) Filed: Jan. 28, 2004

(65) Prior Publication Data

US 2004/0183239 A1    Sep. 23, 2004

Related U.S. Application Data

(60) Division of application No. 10/073,386, filed on Feb. 12, 2002, now abandoned, which is a division of application No. 09/160,895, filed on Sep. 25, 1998, now Pat. No. 6,398,885, which is a continuation-in-part of application No. 08/582,373, filed on Jan. 11, 1996, now abandoned.

(51) Int. Cl.
*C21D 9/00* (2006.01)
(52) U.S. Cl. ............ 266/249; 219/675; 148/903; 148/640
(58) Field of Classification Search ........ 148/566, 148/639, 640, 903; 219/675, 600, 639; 266/249

See application file for complete search history.

(56) References Cited

U.S. PATENT DOCUMENTS

| | | | | |
|---|---|---|---|---|
| 3,240,639 A | * | 3/1966 | Lihl | 148/903 |
| 3,365,563 A | * | 1/1968 | Basinger | 219/607 |
| 3,675,905 A | * | 7/1972 | Placek | 432/24 |
| 4,237,359 A | * | 12/1980 | Roth | 266/129 |
| 4,718,950 A | * | 1/1988 | Nishikawa | 148/565 |
| 5,018,706 A | * | 5/1991 | Butler et al. | 266/80 |
| 5,911,844 A | * | 6/1999 | Benedyk | 148/639 |
| 6,174,388 B1 | * | 1/2001 | Sikka et al. | 148/512 |

OTHER PUBLICATIONS

ASM Handbook, vol. 4, Heat Treating. pp. 164-183 Apr. 5, 1995.*

* cited by examiner

*Primary Examiner*—Scott Kastler
(74) *Attorney, Agent, or Firm*—James G. Staples

(57) ABSTRACT

Differential hardening apparatus for softening a portion only of a metal workpiece such as a die block consisting of apparatus for presenting a workpiece to a heat source which impinges heat directly on the workpiece and control means for causing the heat to be directed only long enough to soften only the portion which receives the heat so as to create a softened portion, such as the shank portion of a die block, and an unaffected hardened portion, such as the body portion of the die block.

8 Claims, 6 Drawing Sheets

APPARATUS FOR SOFTENING A SELECTED PORTION OF A STEEL OBJECT BY HEATING

This application is a division of application Ser. No. 10/073,386, filed Feb. 12, 2000, now abandoned, which is a division of application Ser. No. 09/160,895 filed Sep. 25, 1998, now U.S. Pat. No. 6,398,885B1, issued Jun. 4, 2002, which in turn is a continuation-in-part of application Ser. No. 08/582,373, filed Jan. 11, 1996, now abandoned.

This invention relates to apparatus for softening a selected portion of a metal object by heating and will be described in the context of eliminating or at least drastically reducing the cracking which today frequently occurs at the junctions of the body and shank of die blocks and similar parts.

BACKGROUND OF THE INVENTION

Die blocks are well known forging implements which, after the sinking of an impression therein to thereby form a die, are used in forging machines such as hammers. A hammer die, after final machining and heat treatment, is then fitted to a die holder in the hammer. A typical hammer die has a large thick body (to provide for one or more resinkings of the impression) and, usually, a relatively short, dovetailed shaped shank located in the middle of one side of the body and extending the length of the body. A typical shank is about 2" in height.

In operation a hammer die is exposed to extremely rugged conditions. In normal operations with all machine components properly positioned and secured, tremendous shock loads are transmitted to all portions of the die. Such loads, which are derived from the many tons of impact forces resulting from the weight of the downwardly driven ram portion of the hammer die striking the workpiece resting in the die holder of the hammer die, have their greatest effect on the weakest portion of the die which, as is well known, is the junction of the shank and body of the hammer die. All too frequently the dies, which may range in hardness from about 28 Rc to about 54 Rc, are cracked or fractured at the shank-body junction of the die and this can lead to catastrophic failure.

Many forging die applications require a tool steel die block that has been heat treated to a high hardness level to optimize the wear resistance of the working face. At the same time the shank portion of the die block requires a lower hardness level to facilitate machining and prevent cracking of the filet radius during the forging process. The "composite" design is achieved by heat treating the entire block to the high face hardness and then selectively tempering the shank portion at a tempering temperature higher than that used to temper the entire block.

Salt Bath Shank Tempering

In the current practice the shank is tempered by immersing a portion of the previously heat treated and hardened die block into a bath of molten metal salt containing barium chloride ($BaCl_2$) at a temperature of 1250° F. (677° C.). Heat from the molten salt is conducted into the submerged portion of the die block, is transmitted through the block, and is lost through radiation and convection from the portion of the block exposed to the ambient air above the salt. After approximately 180 minutes a steady state heat transfer condition is established where the highest temperature of approximately 1250° F. (677° C.) is present at the submerged corner. The temperature decreases to approximately 1050° F. (566° C.) at the salt immersion depth. The temperature continues to decrease toward the top surface of the die block exposed to the ambient air. The final temperature at the top (working face) of the die block depends on the depth immersion and total height of the die block. It is imperative that the working portion of the die block remain below the original die block tempering temperature to prevent softening of the working face. The metallurgical effectiveness of the shank tempering process depends on the combination of the temperature achieved and time held at that temperature. The current practice specifies a total salt bath treatment of 6 hours (3 hours after steady-state is reached) to allow for sufficient tempering of the shank portion.

Problems with Salt Bath Shank Tempering

Technical, maintenance, environmental, and safety problems limit the commercial success of the current process. Technically the process is limited by the relatively slow rate of heat input generated by the molten salt at 1250° (677° C.). The slow heat input rate coupled with the heat lost due to radiation and convection from the portion of the block exposed to the ambient air limits the maximum temperature within the block, at that salt immersion depth, to approximately 1050° F. (566° C.). The extent to which the shank is selectively tempered is limited by the temperature achieved in the shank portion of the die block and the time held at temperature. The maximum temperature of the top (working face) must remain below the original tempering temperature of the parent block to prevent softening. This maximum working face temperature depends on the depth of immersion into the salt bath (heat input) and the height of the block above the salt bath (heat output). For small blocks it is impossible to sufficiently temper the shank portion without softening the working face due to the relatively small portion of the block above the salt bath. Further the process is somewhat time consuming requiring a batch processing time of six hours. It is possible to increase the effective tempering temperature at the salt immersion depth and decrease the batch processing time by increasing the temperature of the molten salt bath, however, this only increases the maintenance, environmental, and safety problems associated with the process.

Several maintenance problems hinder the commercial success of the salt bath shank tempering process. Costly stainless steel pots are used to contain the molten salt used for the shank tempering process. These pots are corroded by the salt and require replacement approximately every eight months resulting in an annual cost of $5,700. Any increase in salt pot operating temperature will significantly reduce the life of the salt pots. The actual metal salt must be replenished at a cost of approximately $2,000 annually. In addition to the cost of these consumables is the annual cost of approximately $21,000 for the natural gas used to heat the pot. Additional costs are associated with the maintenance of the burners, thermocouples, and the control systems.

Several environmental and safety problems plague the use of the salt bath shank tempering process. The barium chloride contained in the salt is considered a hazardous waste under the Resource Conservation and Recovery Act due to its barium content which is a heavy metal and requires special disposal procedures. Overexposure to this salt can lead to several varied health risks. Skilled operators are required to conduct the salt bath processing due to the many safety hazard associated with the molten salt. Extreme care must be taken to avoid the introduction of water into the molten salt. Condensation or ice that may have accumulated on the die blocks will become explosive upon contact with the molten salt if not thoroughly removed prior to immersion in the bath. If moisture is introduced the rapid conversion to steam can splatter the molten salt onto adjacent personnel. Care must also be taken when placing blocks into the salt bath to avoid inhalation of the powdered metal salt when loading the pot. Because of these environmental and safety concerns it is required that any salt bath tempering process must be located in a specialized shop area.

Following the salt bath treatment the blocks must be stored until cool. Next, the salt that adheres to the sides of the block must be removed prior to the moving the blocks to the next operation. Again this is required to contain the metal salt and prevent contamination of other locations. The same precautions must be maintained when handling the salt that is removed from the sides of the block.

The results of such treatment, while better than no treatment, are, in a sense, marginal since the process is difficult to regulate and measure with precision and a substantial element of judgment enters into the practice of the process, even on a day-in-day-out routine basis. Further, the process is lengthy, often requires the use of cranes or other auxiliary equipment to manipulate, hold and control the position of the die block during the salt bath treatment. The blocks, which are custom made, are of different sizes, shapes and widths, and this non-uniformity makes it even more difficult to properly reduce the hardness at the inside corner of the shank cut-out.

In summary the operating drawbacks to the salt bath system may be summarized as follows:
1. Salt pot has to be replaced twice a year at a cost of approximately $4,000.
2. The salt bath is a toxic waste and disposal is difficult.
3. Salt pot is labor intensive.
4. Salt pot has to be in a special, protected location.
5. Splash and inhalation from the salt is dangerous to the operator.
6. Periodic cleaning is necessary.
7. Salt sticks to sides—has to be washed off.
8. There is a danger of explosion due to the presence of water or ice on the die block.

There is therefore a need for a method and apparatus for preventing cracking at the shank-body junction of die blocks which is speedy in application, requires minimal handling of the die block to be treated, minimal auxiliary equipment during processing, eliminates the use of hot, liquid salt baths with their above described drawbacks, and gives predictable and duplicatable results over the range of sizes, shapes, and compositions of die blocks currently produced.

SUMMARY OF THE INVENTION

The invention is a shank-body drawing or tempering system utilizing electric heat that eliminates the need for the currently used salt baths with their attendant drawbacks as described above, yet which can process all shapes, sizes and compositions of die blocks in a speedy, efficient and reproducible manner with consistent results, while requiring only a fraction of the cost of capital equipment and operating costs of salt baths, including savings in manpower, space and consumable materials.

In a first embodiment of the invention paddle shaped induction heater means are placed in operative contact with a ferrous workpiece and an enclosure which does not transmit induction currents, said paddle including induction heating coil means having a capacity to heat the critical areas of the die block to any desired depth and any degree of softness using well known operating parameters currently utilized in induction heating devices. Preferably a die block is placed, in a shank down position, on a non-magnetic base and an induction heating paddle is placed in contact with the shank, the exposed portion of the paddle being blocked off with non-magnetic material. The water cooled copper tube induction coil, which is encased in a non-magnetic jacket, is activated for a sufficient period of time, depending on size, shape and composition of the workpiece, to draw the shank-body to a condition in which cracking is either eliminated or drastically reduced as contrasted to the results currently achieved with salt baths or other means.

In another embodiment of the invention a die block alter hardening but either before or alter a shank is formed in the back side (i.e.: the non-working surface) of the die block is subjected to infrared heat. The infrared beat is preferably generated by tungsten halogen lamps which are arranged to direct the radiant energy at the surface to be treated. While no limits on the length of the waves of the electromagnetic spectrum have been positively established, good results have been obtained with short wave radiation, i.e.: 0.78 to 2.0 µm.

DESCRIPTION OF THE DRAWING

The invention is illustrated more or less diagrammatically in the accompanying drawings wherein.

DETAILED DESCRIPTION OF THE INVENTION

Figure 1:
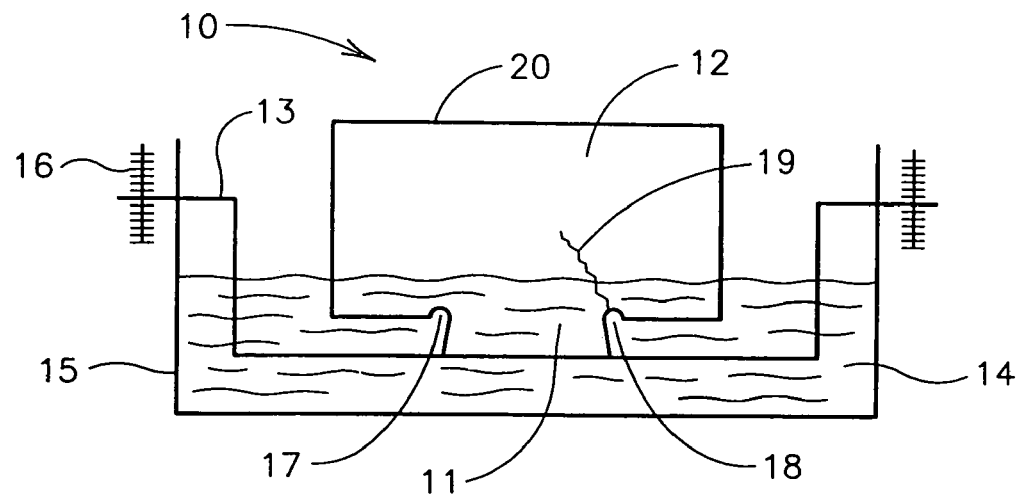
FIG. 1 is a view of a current prior art salt bath process and system for eliminating cracking at the shank-body junctions of die blocks.

In the following detailed description of the invention like reference numerals will be used to refer to like parts from Figure to Figure in the drawing.

Referring first to FIG. 1 the current procedure, labeled Prior Art, for reducing cracking at the shank-body junction of a die block is there illustrated. A die block is indicated generally at 10, the die block having a shank 11 and a body indicated generally at 12. The die block is shown positioned shank down on a special basket 13 in a salt bath 14 held in tank 15. If the vertical dimension of the shank is about 2 inches, which is a conventional shank dimension of ferrous alloy die blocks currently intended for impact forging, such as hammer machines, it will be noted that the depth of the bath is about 3–4 inches, and thus about 1–2 inches of the body 12 of the die block 10 is submerged in the bath 14. The depth to which the block is submerged can be adjusted as needed by adjustment mechanism 16. Since the block 10 can be quite large, for example two feet or more in width together with lengths into double figures, the block represents a very substantial heat sink. As a result, to heat a block, or several blocks if the tank 15 is used to capacity, a large number of calories will be absorbed by the blocks from the hot liquid and hence temperature measuring equipment must be used to continuously monitor the temperature of the bath, and provisions made to add heat to the bath, usually gas burners located beneath the tank. It will be seen that the shank-body junction on either side of the shank has had a fillet formed therein, indicated at 17 and 18. Even with such procedures and precautions, cracking remains a problem. A typical notch crack, as it is called, is indicated at 19. If the crack is severe enough it may extend all the way through to the die face 20 in which event the die is either a total loss or a large amount of rework, including welding and possibly even banding, must be performed, to put the die back into working condition. Even if the crack extends only part way into the body 12 and assuming the operator is alert enough to notice it after it begins, the die must be immediately taken out of production and reworked. Hence down time with all the well known adverse consequences of lost production, are encountered. It should be understood that, more often than not, the block 10 will not have a shank 11 when salt bath treated. A shanked block has been shown for ease of understanding and particularly to illustrate crack 19.

Figure 2:
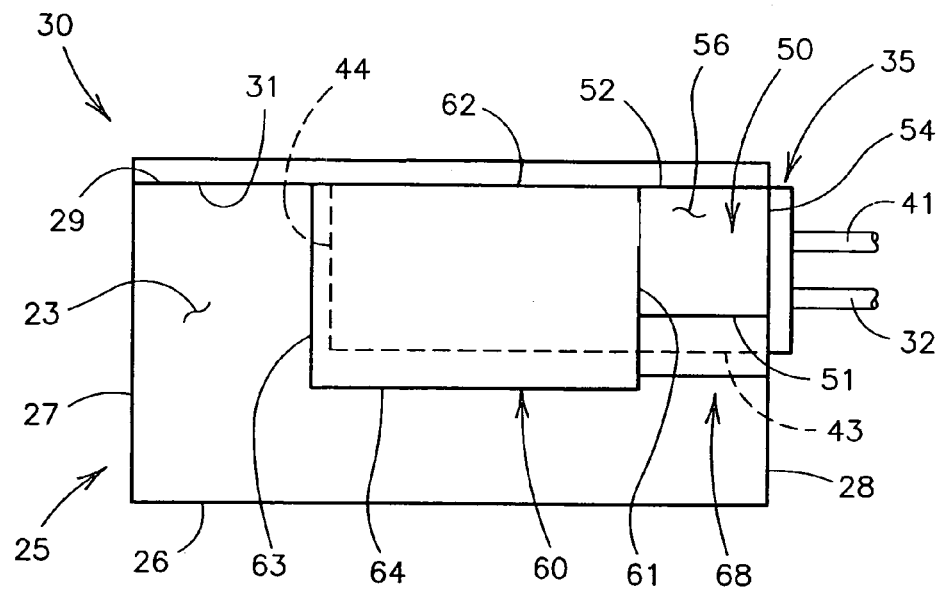
FIG. 2 is a top plan view of the system of the invention showing a die block being treated.
Figure 3:
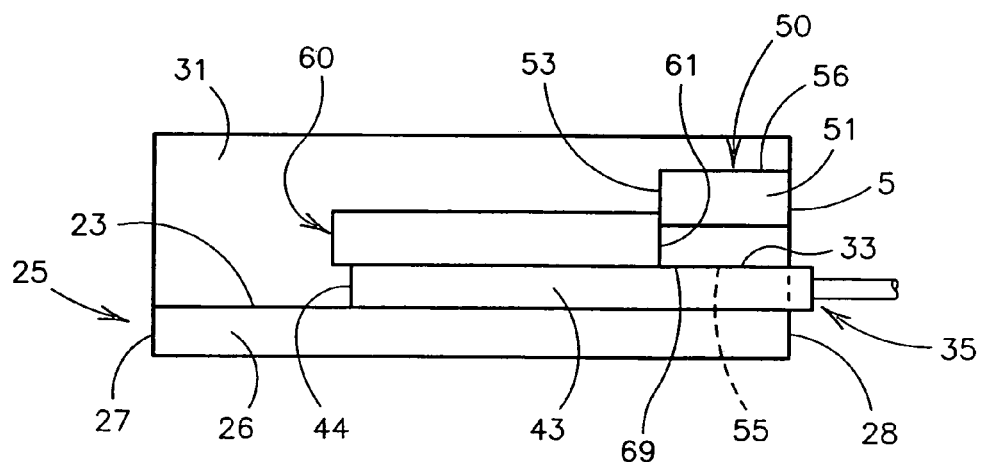
FIG. 3 is a front view of FIG. 4 with parts omitted for clarity.
Figure 5:
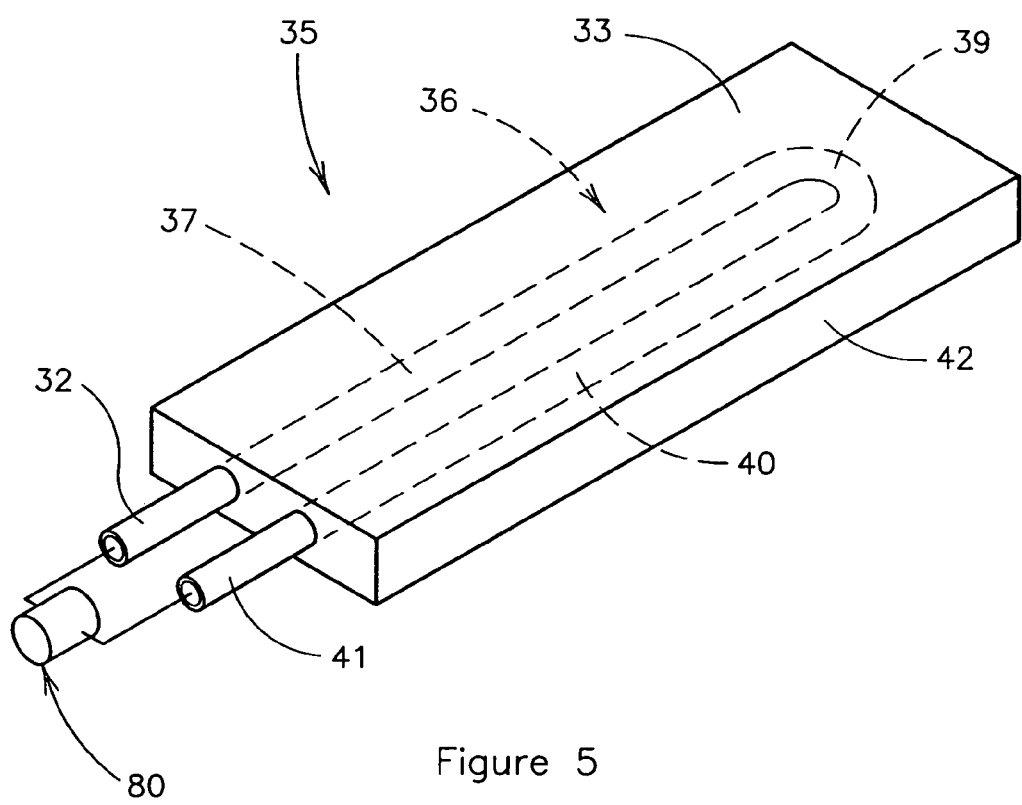
FIG. 5 is a perspective, partly diagrammatic view of the induction heating paddle used in the invention.

Referring now to FIGS. 2, 3 and 5 a table is indicated generally at 25, said table being composed of a material which does not conduct induction heating currents. A stainless steel or even a granite or suitable ceramic material may be used in the construction of table 25. The table has a front edge 26, left edge 27, right edge 28 and rear edge 29. Means, in addition to the stainless steel, granite or ceramic material of table 25, for confining the heat from the electric heat source to the body-shank junction portion of the die block includes a backing plate indicated generally at 30, the lower portion of which, in this instance, is butted against rear edge 29 of the table 25. As can best be seen in FIG. 3, backing plate 30 extends upwardly a substantial distance so that its front face 31 forms an abutment wall of considerable height.

Referring now to FIG. 5 an induction heating means which may be referred to as a paddle is indicated generally at 35. Paddle 35 is an induction heating coil system composed of a length of continuous, hollow copper tubing, indicated generally at 36, said tubing having an inlet 32, an entry run 37, a bend 39, a return run 40 and an outlet 41. It will be seen that entry run 37 and return run 40 are parallel to one another, and that these heating elements are substantially equally spaced from one another and lie in a common flat plane, The hollow, fluid light tubing is enclosed in a steel jacket, indicated generally at 42, whose width and length dimensions can be of virtually any desired measurements and whose height can vary to a considerable extent. It will be understood that the longer the length the greater will be the heat generated, and hence either the greater must be the cooling water flow rate through the tubing, or the larger must be the diameter of the tubing so as to carry enough coolant to remove the heat generated during the process. It will be understood that the paddle may, if desired, be made in two longitudinal sections so that one or more intermediate, mating sections, each with its own length of copper tubing may be added to the paddle to increase or decrease its width as desired, the short lengths of tubing in the added sections being mated to ends of the copper tubing in bend 39. The top end face of the paddle is indicated at 33.

Referring now to FIGS. 2 and 3 particularly, the paddle 35 is shown laying flat on the upper surface 23 of table 25, and butted against the front face 31 of backing plate 30 at the table-backing plate junction. The relationship of the front edge 43 and the rear edge 44 of the paddle 35 to the backing plate 30 is shown best in FIG. 2.

A through hardened die block is indicated generally at 50 resting upon the right end portion of paddle 35. The die block, which, in this instance, does not have a shank formed in it, is defined by front side 51, rear side 52, left edge 53, right edge 54, shank portion 55 and body portion 56. As van be appreciated from FIG. 3, the entire flat surface area of the shank portion bottom 55 of block 50 is in surface abutting contact wit the top surface 33 of the paddle 35.

It will be noted that the surface area of paddle 35 is considerably larger in both length and width directions than the dimensions of block 50. In this condition, and in order to ensure efficient operation of the induction heating coil paddle 35, the exposed surfaces of paddle 35 are covered with blocks of material which do not conduct induction heating currents. In this instance a large block 60 is placed on the left end portion of the paddle 35. The right edge 61 of block 60 is placed on the left end portion of the paddle 35. The right edge 61 of block 60 butts against the left edge 53 of the die block and the rear edge 62 butts against front face 31 of the backing plate 30. As can be best seen in FIG. 2, the left edge 63 and front edge 64 or block 60 slightly overlap the rear edge 44 and the front edge 43 of the paddle.

A second block, or blocker, is indicated generally at 68. The bottom 69 of block 68 overlies, in surface abutting engagement, the portion of the right portion of paddle 35 which is not covered by die block 50. As a consequence it will be seen that heat from the induction coil will be confined to the surface of the body-shank portion of the die block by the structural heat blocking members, table 25, backing plate 30, block 60 and blocker 68.

It will thus be seen that the surface of die block 50 which is to be drawn is in contact over its entire surface area with paddle 35 so that electric heat energy generated by paddle 35 directly strikes die block 50, that is, in the absence of any intervening materials, Further, all portions of the upper surface 33 of paddle 35 which are not covered by the die block have been covered by a blocker so that the upper surface 33 of the paddle is not exposed to the atmosphere. As a consequence, table 25, backing plate 30, block 60 and block 68 form means for confining the heat from the electric heat source to the surface of the body-shank junction portion of the die block.

Figure 4:
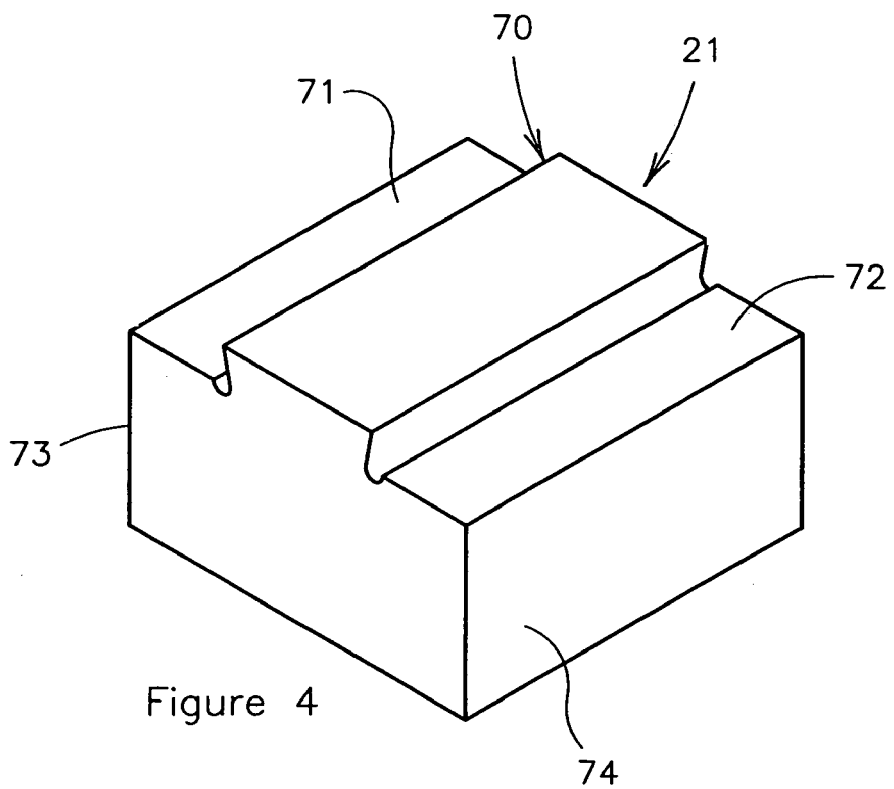
FIG. 4 is a view of a die block with which this invention may be used, the die block being illustrated in a final machined, shank up position.

In FIG. 4 the block 50 has been removed following treatment, and a shank machined into the non-working face thereof. Specifically, the shank 21 may, for example, have a width of about 4 inches with the left and right sides thereof having a vertical dimension of about 2 inches, and shoulders, or die wings, 71, 72 of about 10½ inches, so that the total.

By way of comparison, in the salt bath system a rack is usually required for pieces up to about 8,000 pounds during treatment. Above this weight and size tongs, which are controlled by a crane, must be used. As a consequence, for processing which requires a rack the piece dimension should have practical optimum measurements of about 26 inches wide by 48 inches in length by 22 inches in height, with an absolute maximum of about 28 inches wide and 50 inches long. If no rack is used the preferred optimum dimensions are about 38 inches wide by 48 inches long with an absolute maximum of 40 inches wide by 50 inches long. Although the above figures may vary to some degree form installation to installation they illustrate the fact that there is a practical maximum limit to the size dimensions which can be accommodated in the prior art salt bath system.

In operation, when the induction coil is energized the induction current acts only in the metal components, and specifically only in that portion of the block 50 which overlays paddle 35. A coolant system, including a pump P, is indicated generally at 80 for circulating coolant under suitable and conventional pressures in the copper tubing 37–41. The runs of the copper tubing are connected to the Power Source in a conventional manner. As an example, the application of 60 cycle current for from 15–30 minutes will usually be sufficient to raise the temperature to about 1130° F., which temperature, while sufficient to adequately draw the shank-body junction area, will not overheat a cavity which has been previously sunk in the die block. It will be understood that the term "draw" or "drawing" is used in this application synonymous with tempering which is carried out fundamentally for the purpose of precipitating iron carbide from martensite.

Although a single paddle which, in this instance spans the entire distance between the right side of the body and the shank has been shown, it will be understood that it may be more convenient in other set-ups to use two small paddles.

When the system is not in use, no equipment must be maintained and no special precautions need be taken to ensure the safety of personnel in the area. The paddle 30 will promptly cool down to near room temperature after the power is shut off and the coolant circulated for a few minutes, and the heat pick-up by the large granite non-magnetic base 25 and the blockers 60, 68 will be minimal.

The infrared energy embodiment of the invention is illustrated in FIGS. 6–10.

Factors of importance in the use of infrared energy are: (1) the absorption characteristics of the material being heated; (2) the power density of the radiating area on the part; (3) the ratio of convected heat to radiant heat; (4) the geometry of infrared emitters and reflectors including furnace design; and (5) the type of control required.

Infrared energy is the portion of the electromagnetic spectrum between 0.78 and 1000 μm. The infrared electromagnetic spectrum can be divided into three divisions: (1) short wave 0.78 to 2.0 μm, (2) medium wave 2.0 to 5.0 μm, and (3) long wave 5.0 μm to 1 mm. The actual emission spectrum of a given source is dependent upon its temperature. Increasing the source temperature will result in shorter overall wavelengths of the energy. This also corresponds to an increase in the overall emissive power. Increased temperature rise of the part can be achieved by increasing the heat transfer, dwell time, or the amount of infrared incident on the target. The wavelength of light utilized in the herein described system, approximately 1.2 μm, will allow for maximum percent emissive power. This wavelength is produced by glowing the tungsten halogen filaments at approximately 4892° F. (2750° C.).

Figure 6:
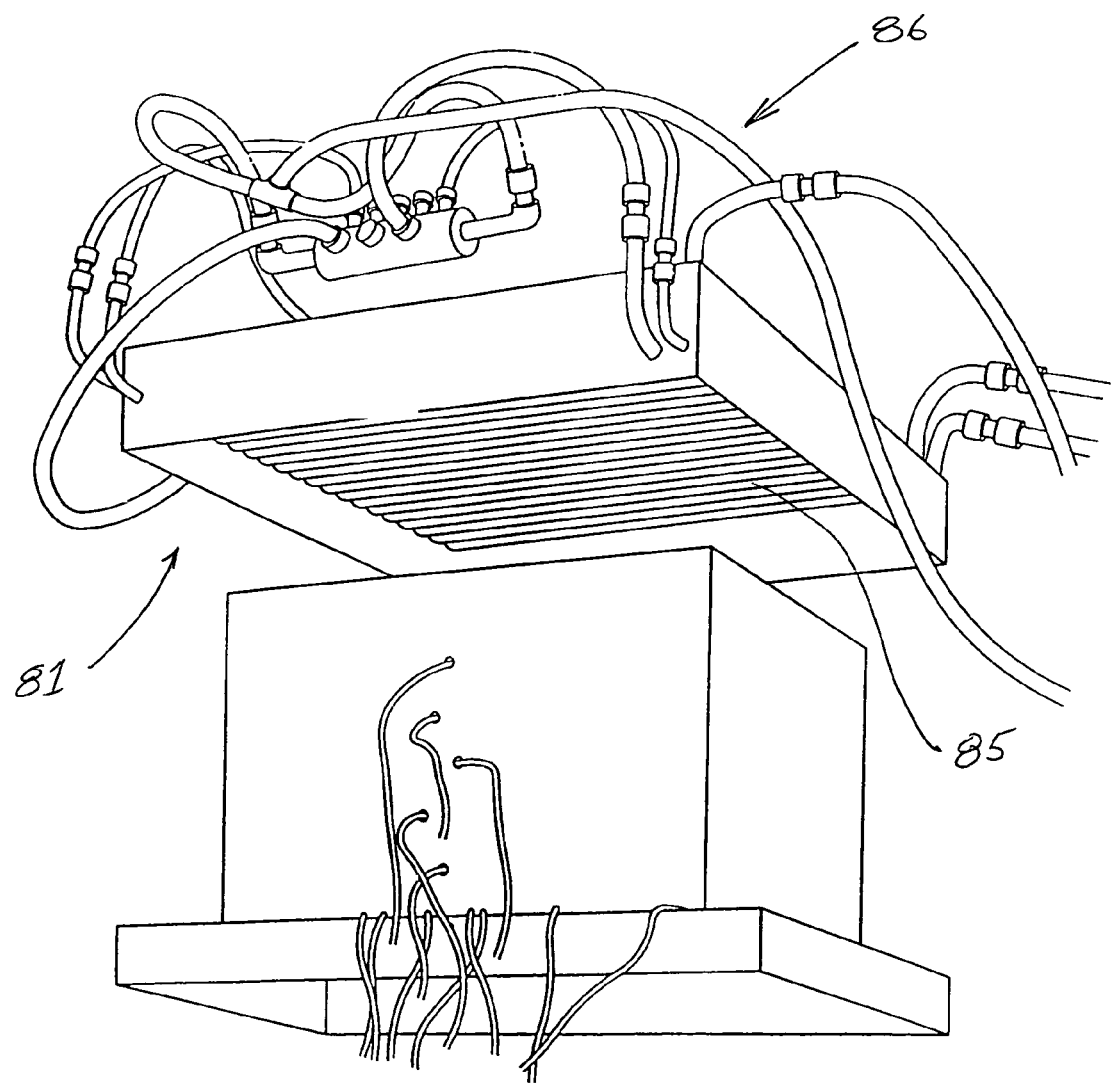
FIG. 6 is a perspective view, in an open position, of a simple non-insulated infrared furnace utilizing linear tungsten halogen tubes arranged in a rectangular shape corresponding to the shape of the surface of the illustrated die block which is to be softened.
Figure 7:
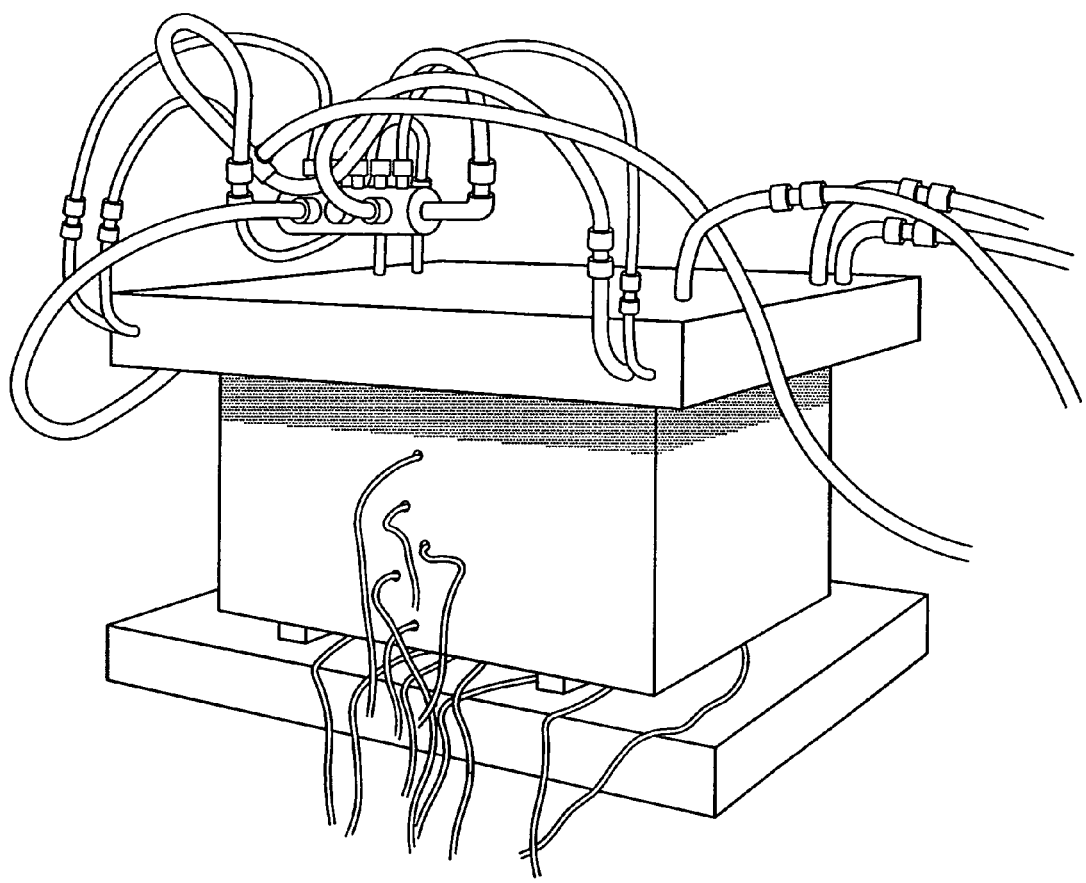
FIG. 7 is a perspective view of the infrared furnace of FIG. 6 in an operating position.

The infrared furnace of FIG. 6 is a flat panel cold wall furnace; i.e.: only the selected portion of the workpiece, here the body-shank junction portion 87, see FIG. 7, of the die block 88, is heated to the desired temperature. The furnace includes structural heat blocking members comprising a hood, indicated generally at 81, atop 82, depending edge walls 83, 84, tungsten halogen filament heating elements 85, and, in this instance, cooling means indicated at 86, all of which confine the heat from the electric heat source to the body-shank junction portion of the die block. It will be seen that the heating elements 55 are parallel to one another and are equally spaced from one another as they lie in a common flat plane. The furnace utilizes 100 W per linear inch elements 85, which function as means for subjecting said selected portion to heat energy derived from said source 85 of infrared heating. Due to the low thermal mass of the heating elements 85, the furnace is capable of its full heat flux in approximately 2 seconds after start-up. Also, due to its cold wall design, the furnace cools extremely quickly. The furnace includes conventional means such as any simple raising and lowering linkage, not shown in detail for purposes of clarity, for maintaining said selected portion 87 and said source of infrared heating 85 in fixed relationship to one another during subjection of said selected portion 87 to said source of infrared heating 85.

In one demonstration, approximately 12 infrared heat treatments were performed on an 18-×22-×12-in-thick steel block instrumented with control means represented by the 12 thermocouples in FIGS. 6 and 7 which were located at various depths and locations throughout the block. A maximum of 51.2kW was utilized on the top surface (22 by 18 in.) of the shank portion of the steel block with an infrared flat panel for 47 minutes prior to cutting back the power by adjustment of the control means to maintain the surface temperature of the block at 1320° F (716° C.). After 1 hour and 18 minutes, the furnace had to be held at 21.4 kW to maintain the required given temperature; that is, to limit the amount of heat energy which impinges onto the uncovered flat surface at the shank portion to an amount which softens only the shank portion.

A series of experiments were performed in order to see the effects of several variables, including: (1) surface oxide—(a) unoxidized, and (b) heavily oxidized (i.e.: scale); (2) block insulation—(a) insulating the upper 2.5 in. of the block, and (b) insulating the entire block; (3) edge heating effects; and (4) modeling was also accomplished in order to observe approximate efficiencies.

The uncovered block was initially heated with a heavy oxide scale in order to observe the effects of this heavy loose scale on the infrared heating. A second experiment was performed with the surface of the uncovered block ground revealing unoxidized steel. It was observed that this had little effect on the overall heating due to a couple of factors. The furnace was positioned perpendicularly over the flat surface of the shank portion of the steel block as shown in FIG. 7 so that the flat surface of the shank portion of the steel die block is located in unobstructed facing relationship to the heating elements 85, and so that any light not absorbed by the block would be reflected back by the highly nonabsorbing body top 82 and elements 85 back to the uncovered steel block. Thus the heat from the heat source i.e.: heating elements 85, impinged uninterruptedly directly onto the uncovered flat surface of the shank portion of the die block. The surface of the steel block exceeded 752° F. (400° C.) in less than 10 minutes which is the temperature at which oxidation of the steel will occur and the surface will absorb over 90% of the incident light.

Due to installation of a new multichannel data acquisition system and the need for real time power output of the furnace for modeling, an additional experiment was performed. As can easily be observed in Table 1, the surface of an approximately 1500-lb die block can be brought to the upper tempering temperature in less than 48 min, utilizing less than 52,000 W, and then has to continuously be decreased to 21,000 W to maintain the surface temperature.

TABLE 1

Infrared power flux profile during heat treatment of a die block

| Infrared power flux (W) | Time at power flux (min, s) |
|---|---|
| 51,525 | 47, 40 |
| 49,625 | 2 |
| 46,841 | 1 |
| 45,181 | 1 |
| 42,933 | 1, 50 |
| 41,809 | 1, 10 |
| 40,685 | 2, 40 |
| 39,614 | 2, 10 |
| 38,704 | 1, 50 |
| 36,830 | 2 |
| 33,725 | 3, 10 |
| 36,402 | 4, 20 |
| 33,136 | 10, 30 |
| 30,995 | 7, 20 |
| 30,246 | 8 |
| 29,443 | 9 |
| 27,837 | 3, 30 |
| 26,980 | 22, 50 |
| 25,695 | 5, 20 |
| 25,321 | 1, 40 |
| 23,554 | 15, 10 |
| 22,483 | 49, 10 |
| 21,413 | 31, 50 |

Figure 8:
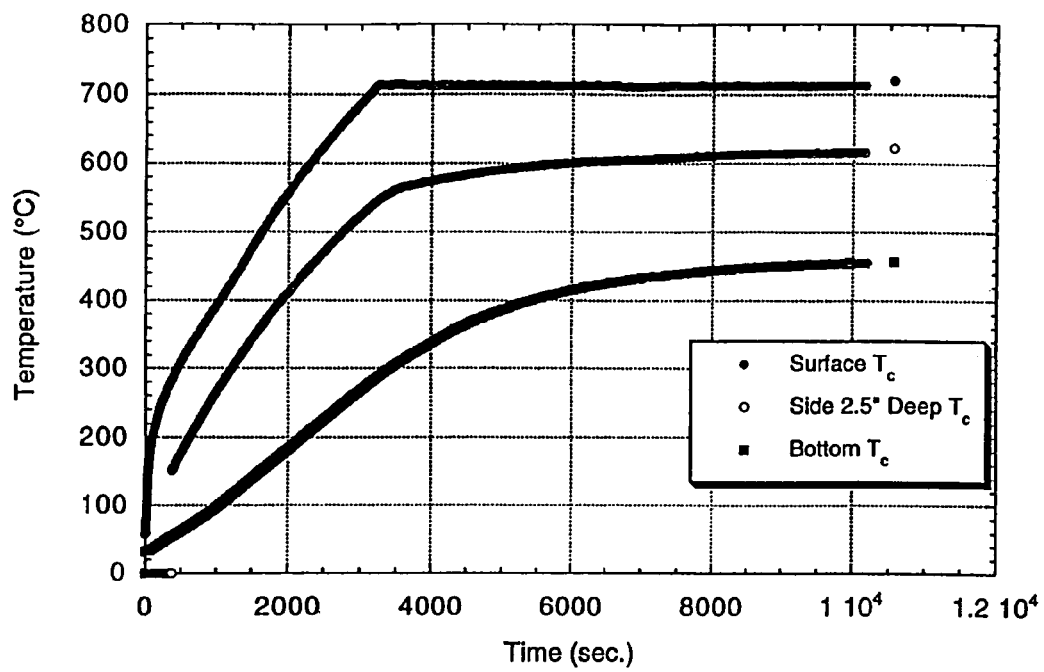
FIG. 8 is an infrared heating profile in a non-insulated furnace with a surface hold at 1320° F. for 3.5 hours.

In a subsequent procedure, a hardened metal block was treated to preferentially soften the back 2.5 in. Three thermocouples were attached to the block to monitor temperature during the softening process at the surface, 2.5 in. down the side and on the back side. This block was about two-thirds the size of the block utilized for all of the temperature profiling of FIG. 7. The block with a 2.5-in. insulation wrap was heat treated at 1320° C. for 3½ hours with the infrared furnace, and the temperature profile is shown in FIG. 8.

Figure 9:
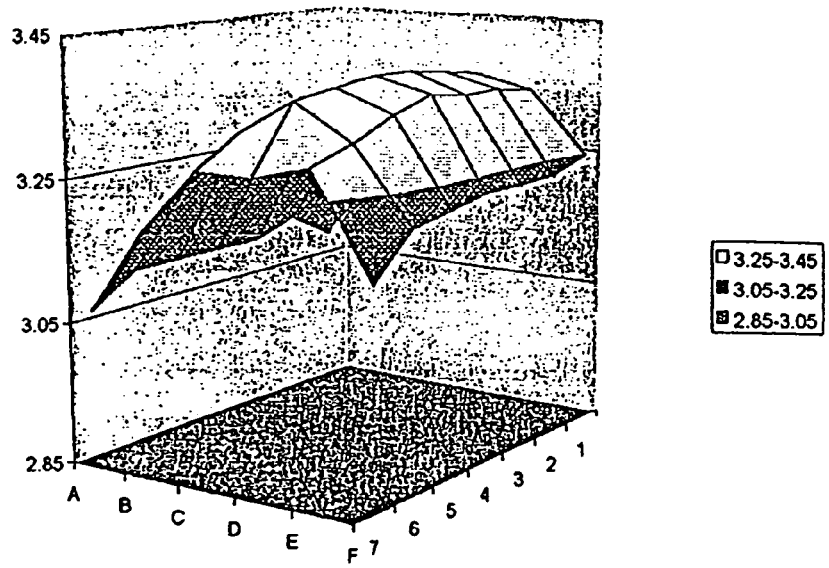
FIG. 9 is a hardness profile for an infrared heat treated die block.

The foregoing results indicate that infrared heating, like the induction heating system of FIGS. 2, 3 and 5, makes possible the lowering of the hardness level of the shank portion to a hardness level below the body portion of the die block which lies beneath the shank portion: in other words a differential hardening within the body of the workpiece, here a die block. The block hardness was 2.95 BID (429 RB). To verity the softening effect of the infrared heat source, the following procedure was used: (1) 0.5 in. of material was removed, and (2) Brinnel hardness tests were taken over the surface using a 2- by 2-in, grid. This procedure was performed until the hardness was measured at a distance of 2 in. below the heated surface. As can be seen in FIG. 9, the hardness 2 in. below the surface is an average of 3.26 BID (350 HB). The "crowned" shape of the hardness distribution could be due to the loss of infrared energy from the sides of the block or from the natural hardness distribution from edge to edge of the block.

In conclusion it can be seen that infrared can be readily utilized to preferentially soften steel to a given depth. Results to date suggest efficiencies on the order of almost 86%. Therefore, combining the fact that the infrared system can be readily turned on and off in seconds and results in no environmental hazards, the infrared system has very considerable cost savings over the conventional salt bath system.

It will thus be seen that an apparatus utilizing electrical energy has been disclosed for preventing cracking at the shank-body junction of die blocks which is speedy in application, requires minimal handling of the die block undergoing treatment, eliminates the need for the use of auxiliary equipment during treatment, eliminates the use of hot, liquid salt baths with their attendant drawbacks including environmental concerns, and which gives predictable, and duplicatable, results over a wide range of sizes, shapes and compositions of ferrous alloys.

Although a preferred embodiment of the invention has been illustrated and described, it will at once be apparent to those skilled in the art that modifications may be made within the scope of the invention. Accordingly it is intended that the scope of the invention not be limited by the foregoing exemplary description but solely by the hereafter appended claims when interpreted in light of the relevant prior art.

What is claimed is:

1. Apparatus for reducing cracking at the body-shank junctions of a hardened steel die block, by softening the shank portion only, the shank portion of said die block having a flat surface, said apparatus including, in combination support structure for maintaining a die block having a body portion and a shank portion stationary during processing, an electric heat source in close proximity to the flat surface of the shank portion of the die block, said flat surface being uncovered, said electric heat source being composed of parallel runs of heating elements, all portions of adjacent parallel runs of said heating elements being substantially equally distantly spaced from one another in a common flat plane, all portions of said adjacent parallel runs of said heating elements being substantially equidistantly spaced from the entire flat surface area of the shank portion of the die block which is in close heat transference proximity thereto, said electric heat source being positioned to impinge heat from t he electric heat source uninterruptedly directly on to the uncovered flat surface of the shank portion of the die blocks, control means which limit the amount of heat energy which impinges onto the uncovered flat surface of the shank portion to an amount which softens only the shank portion of the die block to a hardness level lower than the hardness level of the body portion of the die block which is underneath and integral with the shank portion to effect differential hardening between the shank and body portions of the die block whereby subsequent cracking at the shank-body junction of the steel die block is substantially eliminated, and structural heat blocking members surrounding the electric heat source at all locations except where the flat surface shank portion of the die block is located in unobstructed facing relationship to the heating elements of the heat source.

2. The apparatus of claim 1 further characterized in that the electric heat source is an induction heating coil.

3. The apparatus of claim 2 further including means for enveloping those portions of the induction beating coil which are not in operative relationship with the body portion of the die block.

4. The apparatus of claim 3 further characterized in that the means for confining the induction heating currents are substances selected from the group consisting of stainless steel, granite and ceramic materials which are capable of withstanding, without substantial distortion, the temperatures generated during treatment by the induction heating coil.

5. The apparatus of claim 1 further characterized in that the electric heat source consists of an infrared heater comprised of tungsten halogen lamps.

6. The apparatus of claim 5 further characterized in that the tungsten halogen lamps lie in a common flat plane and are perpendicularly spaced from the surface of the shank portion of the die block.

7. The apparatus of claim 5 further characterized in that the tungsten halogen lamps are short wave lamps.

8. Apparatus for softening a selected portion of a metal object, said selected portion having a flat surface, which includes, m combination an infrared heater in close proximity to the flat surface of the selected portion of said metal object, said flat surface being uncovered, said infrared heater being composed of parallel runs of heating elements, said parallel runs of heating elements lying in a common flat plane, substantially all portions of adjacent parallel runs of said heating elements being substantially equally distantly spaced from one another; in a common flat plane all portions of said adjacent parallel runs of said heating elements being substantially equidistantly spaced from the entire flat surface area of the selected portion of the metal object which is in close heat transference proximity thereto, said infrared heater being positioned to impinge electrical energy uninterruptedly directly on to the flat surface of said selected portion from said infrared heater, structural heat blocking members surrounding the infrared heater at all locations except where the flat surface of the selected portion of the metal object is located in unobstructed facing relationship to the infrared heater, infrared heater controls means which limit the depth to which the infrared heating is applied to the selected portion having the flat surface, to thereby soften the selected portion but not the remainder of the metal object.

\* \* \* \* \*